(12) United States Patent
Kestell

(10) Patent No.: US 12,673,268 B2
(45) Date of Patent: Jul. 7, 2026

(54) EXTENDABLE PARTIES IN VIDEO GAMES

(71) Applicant: Electronic Arts Inc., Redwood City, CA (US)

(72) Inventor: Stephen Roger Kestell, Vancouver (CA)

(73) Assignee: Electronic Arts Inc., Redwood City, CA (US)

(*) Notice: Subject to any disclaimer, the term of this patent is extended or adjusted under 35 U.S.C. 154(b) by 240 days.

(21) Appl. No.: 18/477,420

(22) Filed: Sep. 28, 2023

(65) Prior Publication Data

US 2024/0325930 A1 Oct. 3, 2024

Related U.S. Application Data

(60) Provisional application No. 63/455,736, filed on Mar. 30, 2023.

(51) Int. Cl.
*A63F 13/795* (2014.01)
*A63F 13/80* (2014.01)

(52) U.S. Cl.
CPC ............ *A63F 13/795* (2014.09); *A63F 13/80* (2014.09)

(58) Field of Classification Search
None
See application file for complete search history.

(56) References Cited

U.S. PATENT DOCUMENTS

| | | | | |
|---|---|---|---|---|
| 6,951,516 B1* | 10/2005 | Eguchi | ................... | A63F 13/87 |
| | | | | 463/40 |
| 9,889,373 B1* | 2/2018 | Wiklem | ................. | A63F 13/35 |
| 12,097,437 B2* | 9/2024 | Caballero | .............. | A63F 13/60 |
| 2022/0080324 A1* | 3/2022 | Vaccari | .................. | A63F 13/87 |
| 2023/0001295 A1* | 1/2023 | Marr | ...................... | A63F 13/46 |
| 2024/0367052 A1* | 11/2024 | Templon | ................ | A63F 13/35 |

* cited by examiner

*Primary Examiner* — Ronald Laneau
(74) *Attorney, Agent, or Firm* — Knobbe, Martens, Olson & Bear, LLP

(57) ABSTRACT

A party system of a gaming environment provides to users of the gaming environment parties of sizes that extend beyond the party size limitations of a video game. An extendable party can dynamically create subset parties of users for gameplay as needed, without requiring the party to be ceased. Therefore, an extendable party allows a subset of users, or multiples thereof, to enter into gameplay while maintaining the party as a whole. A party system, video game, or gaming environment can be configured to apply one or more rules or policies to a party that limit or alter a feature or function of an extended party, such as to prevent players among extended parties from providing or receiving competitive advantages.

20 Claims, 6 Drawing Sheets

100

200

300

400

500

EXTENDABLE PARTIES IN VIDEO GAMES

CROSS REFERENCE TO RELATED APPLICATIONS

This application claims the benefits of provisional application U.S. 63/455,736 filed on Mar. 30, 2023, and is incorporated by reference in its entirety.

BACKGROUND

Existing software applications, such as video game applications, support the formation of parties to enable a group of users to engage and communicate with one another in a gaming environment. However, the size, activities, and communication methods of a party are often restricted to one or more limitations of a video game or video game services, such as limitations based on gameplay mode team sizes. Accordingly, there is a need for systems and methods that provide parties extendable beyond the limitations or requirements set by video games to enhance and improve the user experience for any group of players.

BRIEF DESCRIPTION OF THE DRAWINGS

This disclosure will be more fully understood from the following detailed description taken in conjunction with the accompanying drawings, in which.

DETAILED DESCRIPTION

Figure 1:
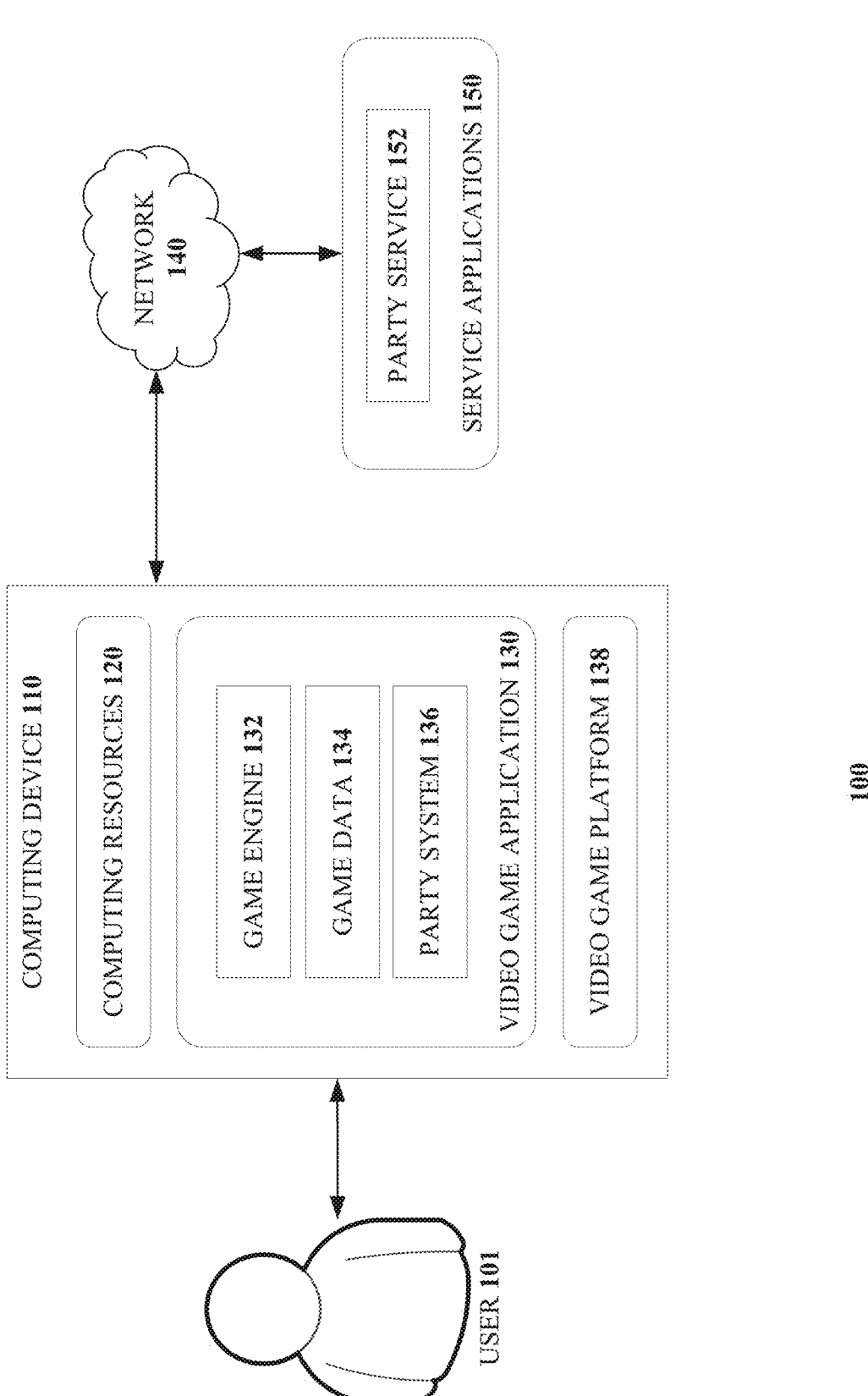
FIG. 1 is a system diagram of a gaming environment according to an example embodiment.

The systems and methods described herein provide for extendable parties among a video game and/or virtual social space.

In the gaming context, a party is a formation or group of players that can be instantiated during the runtime of a video game application and/or a video game platform. As known to a person of ordinary skill in the art, a party communicatively couples players for gameplay and/or communications, such as voice and text chat. For simplicity, "user", "player", and "member" are used interchangeably herein.

The players of a party are commonly referred to as "members" of the party and may join and leave the party based in part on one or more settings, preferences, invites, or requests corresponding to a party, a party system, a video game application, and/or a video game platform. An instance of a party (hereinafter referred to as a "party instance" and as "parties" or "party" in short) can close when all members of the party leave, or by election from one of the members. Alternatively, a party instance can persist indefinitely or for a configured amount of time.

Conventional party systems of video game applications create party instances within and/or among the environment, game sessions, or context of the video game, such that a party instance exists within and/or among the video game application (e.g., at the game level).

Additionally, a party system of a video game platform creates an instance of a party among the environment of the video game platform (e.g., at the platform level), which can apply to and/or be used among a number of video games that correspond to, and/or are in communication with a video game platform and/or the video game platform's services. As such, a party at the platform level is broader and can encompass, integrate, and/or become—or be used as—a party at the game level; thereby enabling platform level parties to be "game agnostic" (e.g., usable among any video game application).

However, these conventional implementations of parties, at either the game level or platform level, are limited or restricted in size (e.g., the amount of members who can be in a party at once) by rules or policies set by video game applications or video game platforms. As such, existing party systems do not allow players to group together beyond these party size limitations, which results in the segmentation of users (e.g., who are friends) by requiring them to create and join separate party instances. Ultimately, these approaches degrade the player experience for groups of players among video game applications and video game platforms.

The present disclosure provides for an extendable party system to video game platforms and video game applications that provides user's parties that can extend beyond party size limitations set by video games (e.g., extended or extendable parties).

As disclosed herein, a party system can dynamically (e.g., in real time or near real time) extend and/or create subset parties among and/or from a main or primary party during runtime—such as in response to the party, a subset of the party, or to a game mode of a video game, enabling the party system to create subsets of parties for gameplay and/or other activities (e.g., playing party or gameplay party). One or more players among the main parties can be placed into one or more subset parties based in part on criteria, and/or their participation in gameplay and/or other activities.

In this way, the "main" party (e.g., used to create subset parties) can persist and/or remain open to keep all the players within the main party in communication with one another. In contrast, the existing systems require a party to be closed and/or for one or more players to be removed from a "main" party in order for one or more of the players to engage in gameplay and/or other activities that include party size limitations not otherwise met by a party (e.g., for a party size being too large).

As a result, the party system can extend, segment, and/or partition a party to one or more subset parties to meet one or more party requirements, restrictions, or limitations of a video game application and/or game mode thereof so that a subset of party members can engage in the respective gameplay. Therefore an extended or extendable party provides for one or more subsets of users to enter into gameplay while maintaining the "extended" party as a whole.

In some embodiments, these extendable parties can be used and/or instanced at both the game level and the platform level. In turn, each subset party can engage in separate game sessions of the same or different video games. Alternatively, a subset, or simply the remaining members of a party not within a subset, can engage in other activities that correspond to the gameplay of other party members. For example, a subset party can participate in activities such as, but not limited to spectating the gameplay of other players or playing mini-games.

For simplicity, a subset party including players engaged in and/or queued for gameplay can be referred to as "playing parties" and include "playing party members" or "playing members". A subset party including players not engaging in gameplay can be referred to as an "extended party", and may be the remainder of the party members that are not part of a playing party. For simplicity, "extend parties" and "extended members" can also be referred to as "non-playing" since they are not engaged in a core or main game mode of a video game. A party can include multiple subsets of parties, including one or more playing parties and extended parties.

To illustrate, these "extended members" are users who would traditionally—under existing systems and techniques—be required to leave a party when a party size limitation would bar or hinder the party from queuing for gameplay. The party system described herein, on the other hand, enables these extended party members to remain in the party and actively engage with the other members of the party through a variety of activities or forms of engagement. For example, an extended party can engage in voice and text communications with other members or subsets of the party, enabling the extended members to perform activities external to the video game and/or video game platform while maintaining engagement and/or interactions with the party.

In addition to allowing multiple subset parties the ability to join game sessions, one advantageous feature the current party system described herein provides is the ability for members of the party to rotate in and out of subset parties that are designated for gameplay in a video game. The rotation of party members in and out of playing party subsets can be based in part on the gameplay and other activities of the members of the party. For instance, non-playing party members can be placed into a selection list of players who will become part of a playing party when the party queues for gameplay based in part on the gameplay of a current playing party or the activities or inputs from non-playing party members.

The selection list can be updated by one or more rules or policies (e.g., selection criteria) configured by the members of a party, such that the members of the party can define how they can each rotate into gameplay. Alternatively, other configurations for the selection criteria of a selection list can be made, such that members can compete to enter the selection list or be chosen at random, among other things.

Furthermore, a party system, video game application, or video game platform can be configured to apply one or more rules or policies to a party that limit or alter a feature or function of an extended party, such as to prevent players among extended parties from providing or receiving competitive advantages. These rules and/or policies can be known as an "exploitation policy" that is made and/or configured in part to deter cheating and abuse through an extended party, and therefore maintain and preserve the integrity and fairness of a video game. These exploitation policies can include suppressing or segmenting communications and gameplay streams among playing party members and non-playing party members. Additionally, this can also include requiring multiple playing parties of a party to queue to different game sessions of a video game, so as to avoid collusion among the players in any particular game session (e.g., match).

For simplicity, and in addition to general and plain meaning as known to those of skill in the art, the term "instantiate" refers to the creation of an instance of an object and/or entity corresponding to a video game and/or video game platform, including parties. Moreover, and in addition to general and plain meaning as known to those of skill in the art, the term "instance" refers to an instantiated object and/or entity corresponding to a video game and/or video game platform, including parties.

Gaming Environment

FIG. 1 is a system diagram of a gaming environment 100 according to an example embodiment. As shown in FIG. 1, the environment 100 includes a computing device 110 that is associated with or operated and/or controlled by a user 101 (also referred to herein interchangeably as "player" or "player 101"). As described herein, the gaming environment 100 enables users to execute and/or play video games applications (or "video game" in short) through their computing devices.

As known to those of skill in the art, user 101 can operate or control the computing device 110, such as for playing a video game application, through inputs provided via input devices of, or associated with, computing device 110. User 101 can provide inputs to the computing device 110 through one or more input devices (e.g., controller, keyboard, mouse, touchscreen, camera, microphone, etc.) associated with the computing device 110. Computing device 110 can output, communicate and/or provide information (e.g., display, render, play audio) to user 101 through one or more output devices (e.g., monitor, screen, touchscreen, speaker, haptics, etc.) associated with computing device 110.

User 101 can be a player and/or an automated agent (hereinafter "agent" in short). As known to a person of ordinary skill in the art, an "agent" can include a machine learning model and/or software to automate or perform one or more tasks (e.g., playing or testing a video game). For instance, agents can function as users 101 and be deployed, controlled, and/or directed by computing device 110 to perform and/or automate one or more tasks in computing devices 110 through techniques known to those of skill in the art.

Computing device 110 can be or include any one or a combination of systems known to those of skill in the art, including, for example, a desktop, laptop, game application platform, game console, virtual reality system, augmented reality system, television set-top box, television, network-enabled kiosk, car-console devices computerized appliance, wearable device (e.g., smart watch, glasses with computing functionality), and wireless mobile devices (e.g., smart phones, PDAs, tablets). The example computing device 110 can store and/or execute computer executable instructions (or code) of applications (or programs or software), such as video game applications, interactive applications, and/or other applications known to those of skill in the art that could include or benefit from the systems and methods described herein.

Computing resources 120 of computing device 110 include hardware and software components that can be used to execute a video game application, among other applications; including, for example, central processing units (CPUs), memory, mass storage, graphics processing units (GPUs), communication or networking components, input devices and/or output devices (I/O devices). It should be understood that the computing device 110 can include any number and/or combination of computing resources; including those described herein and others known to those of skill in the art.

Video game application 130 includes data and software that provides gameplay and other features to users or players of a video game during execution. For example, executing video game application 130 can cause an instance of the video game to be generated. Each instance can be referred to as a "game session" or "gameplay session". The game session can be made up of or include one or more virtual interactive environments. A virtual interactive environment can be or include one or more virtual levels, virtual social spaces, and/or graphical user interfaces that can be interacted with or in, for gameplay or socializing. As such, a game session can include, host or enable—for users—participation and interaction by or with player characters, non-player characters, quests, objectives, and other features, elements, assets, objects or the like known to those of skill in the art.

As illustrated in FIG. 1, by way of example and not limitation, video game application 130 includes game engine 132, game data 134, and party system 136. As known to a person of ordinary skill in the art, a game engine uses game data (e.g., state data, render data, simulation data, audio data, and other data types of the like) to generate and/or render one or more outputs (e.g., visual output, audio output, and haptic output) for one or more computing devices. In some embodiments, game engine 132 includes underlying frameworks and software that execute game code (e.g., gameplay instructions) of video game application 130 for generating game sessions. In some embodiments, game data 134 includes state data, simulation data, rendering data, audio data, animation data, and other data—including game code—used and/or produced by or among game engine 132 during execution.

Party system 136 of video game application 130 is software configured to group one or more users together for communication, gameplay, and/or activities. For example, party system 136 can create a party of users or players (e.g., a grouping users), such as user 101, by communicatively coupling one or more computing devices and/or applications over a network, such as network 140.

Party system 136 is also configured to provide or suggest one or more forms of activities to a party. For instance, the party system can provide—but is not limited to—voice and/or text chat communications, gameplay streaming, subset parties, gameplay recommendations, and other functionality based in part on game data corresponding to a video game or game mode thereof and/or corresponding to one or more members of a party. In some embodiments, the features and activities provided by party system 136 are based in part on one or more rules or policies. The rules and policies corresponding to party activities can be saved and/or captured among the storage of a computing device, such as game data 134 or among a server.

Advantageously, party system 136 is further configured to allow users of a video game to create and join parties with a size that exceeds party size limitations corresponding to one or more game modes of video game application 130. As such, a number of users can come together to engage in gameplay, communication, and other activities without having to decouple or close the party for a subset of the users to join a game session with a party size limitation. To do so, party system 136 dynamically (e.g., in real time) creates one or more subset parties that includes a subset of players of the party to join a game session of a game mode that includes a party size limitation, based in part on data corresponding to the game mode and/or the party.

Video game platform 138 includes data and software that provides an application or collection of applications for accessing and maintaining video game applications and other features corresponding to video games. For instance, a video game platform can be the operating system of a video game console that provides a variety of features and functions for user accounts to access and/or manage a library of video game applications corresponding to the video game platform, as well as to use a number of features including social features, such as creating player parties. Alternatively, a video game platform can be software application for a personal computer (PC) that allows a user to that provides a variety of features and functions for user accounts to access and/or manage a library of video game applications corresponding to the video game platform, as well as to use a number of features including social features, such as creating player parties.

In some embodiments, video game platform 138 also includes a party system for creating and maintaining parties, similar to party system 136. A party system among video game platform 138 can be configured to be video game agnostic, such that it can be instantiated and operated independently of a video game. Additionally, a party system of video game platform 138 can be configured to be compatible with or integrate to the party system of a video game application, such as with party system 136. As such, parties created at the platform level (e.g., among 138) can be used among a video game application (e.g., 130). Alternatively, the party system of video game platform 138 can operate concurrently or in conjunction with, or be complementary to, the party system of video game application 130.

Network 140 includes any method of private and/or public connectivity, networking, and/or communication between or among hardware devices known in the arts. The network may be or include direct wired connections, Near Field Communication (NFC), a Local Area Network (LAN), a Virtual Private Network (VPN), an internet connection, or other communication methods known to those of skill in the art. As illustrated, network 140 communicatively couples computing device 110 to service applications 150.

Service applications 150 provide services to video game application 130. As known to a person of ordinary skill in the art, service applications are software that provide functionality and/or data to other software applications. Services can be provided remotely over a network (commonly known as a "software as a service" or "SaaS" in short) or locally among a system. It should be understood that service applications 150 operate and/or execute a system and/or computing device(s) with computing resources (commonly known as a server); which can be similar to computing device 110.

The service applications 150 can include "gameplay services" corresponding to one or more aspects or features of a video game application, including matchmaking services, communication services, game state management, data storage, and anti-fraud detection, and other game related services of the like. In turn, the service applications 150 can be used to establish and maintain connections among computing devices, video game applications, and/or users that, at least in part, facilitate gameplay parties, player communications, multiplayer gameplay and other interactions corresponding to a video game application and/or user platform corresponding to video games.

Additionally, service applications 150 can include a video game platform corresponding to video game applications. User accounts of the video game platform include data provided by users, such as a username, that identifies a user among gaming environment 100. The video game platform enables a user account to access and/or manage software and/or services of gaming environment 100 for gameplay, such for multiplayer gameplay and other online gameplay features of the like.

Furthermore, service applications 150 can include Party Service 152. Party Service 152 can communicatively couples one or more users to form a group and/or party for gameplay, communications, and/or other activities or interactions, as known to those of skill in the art. In turn, Party Service 152 can instantiate, configure, and/or maintain parties or groups of users for gameplay, communication, and other activities among users or players of a video game application, as known to those of skill in the art.

In some embodiments, the party can be formed within video game application 130. Alternatively, the party can be formed among a video game platform and transition, integrate, and operate in parallel to a video game application. As known to a person of ordinary skill in the art, the service of a video game platform may be accessed and/or integrated among an operating system of a computing device, such as a video game console, or be accessed through a video game platform application that enables users to access and manage their video game applications among a computing device.

Process

Figure 2:
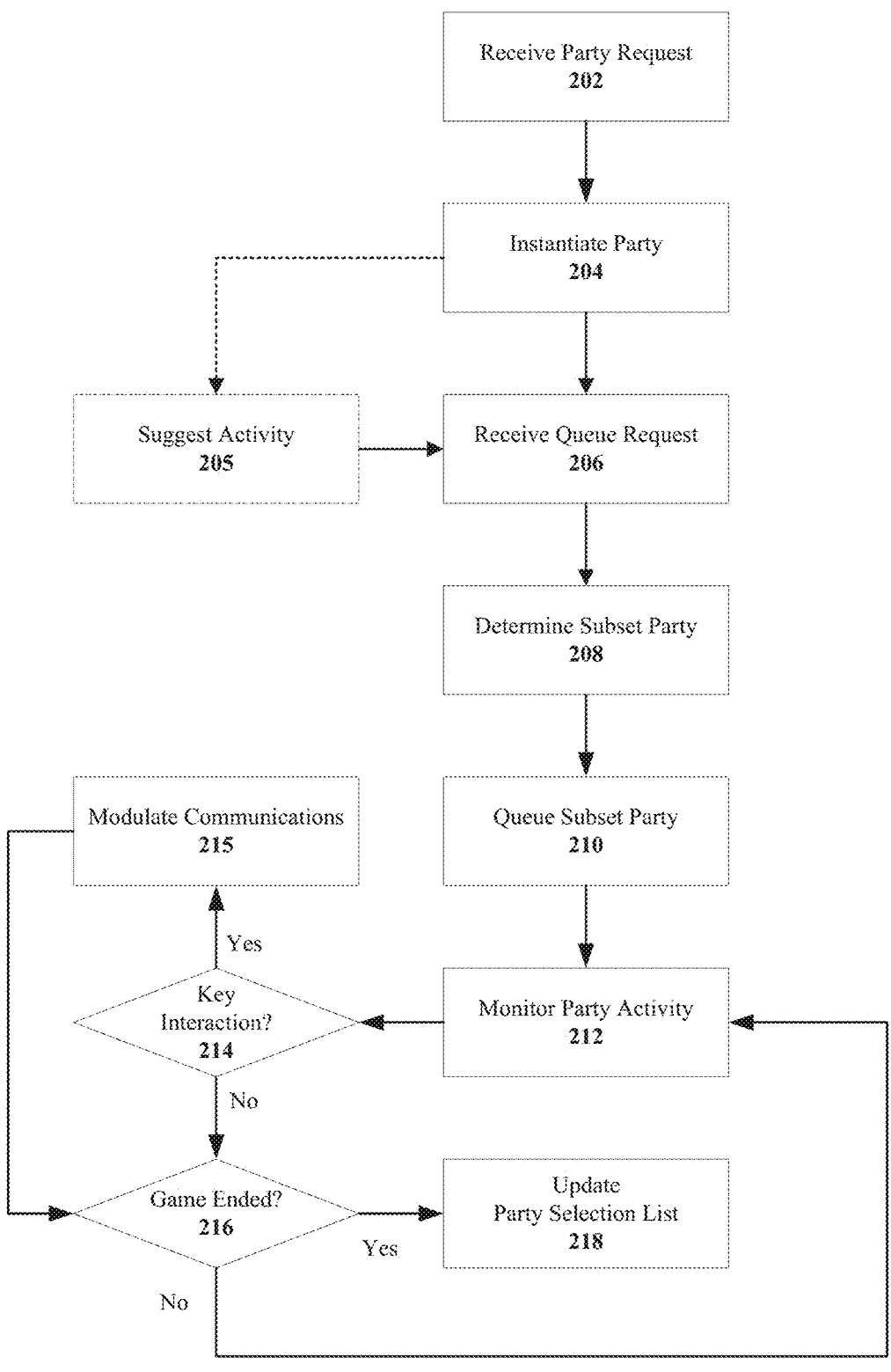
FIG. 2 is a flow diagram of a process to configure parties according to an example embodiment.

FIG. 2 is a flow diagram of a process to configure parties according to an example embodiment. As illustrated, process 200 is used to create a party and queues one or more subsets of the party for gameplay and/or interactive activities. In some embodiments, process 200 corresponds to a party system of a video game application and/or service application, similar to party system 136 and 152 of FIG. 1

At step 202, a party request is received, retrieved, and/or accessed by a party system for instantiating a party of one or more users. A party request can include data, such as rules, policies, criteria, and/or other configurations of the like, that define one or more aspects, features, functions, parameters, permissions, limitations, and/or restrictions of a party. For instance, a party request can include data or criteria for selecting a subset of players for gameplay when the party queues for a game session of a game mode of a video game. In some embodiments, a party request can be made and/or sent by a video game application, service application, and/or video game platform, with or without user input, user direction, or user intervention.

At step 204 a party is instantiated or created based in part on the party request received. An instantiated party refers to an instance of a grouping of one or more users, such that the instance corresponds to video game application, service applications, and/or video game platform that is used in part to facilitate and/or provide gameplay, communication, and other activities among the users of the party. In some embodiments, service applications and/or video game platforms can instantiate and maintain a party for one or more users of the video game platform, enabling the party to be used among different video game applications. Alternatively, a video game application can instantiate and maintain a party for one or more users of the video game application in particular, with or without the use of service applications and/or a video game platform.

At step 205, an activity can be suggested to the party or to one or more users of the party thereof. The suggestion can be an interactive prompt that is sent to and/or received by one or more members of the party. The suggestion can cause, with or without user interaction, one or more user's respective computing devices to queue and/or start an activity corresponding to a video game application or other software. For example, an activity can correspond to a game mode, a mini-game, streaming gameplay, interactive spectating, voice communications, text communications, social media, and other engagements of the like.

In some embodiments, a suggestion a based in part on data corresponding to the users of the party, such as the users' video game library (e.g., list of video game applications owned), favorite video game applications, the size of the party, events in a video game application, game modes of a video game application, the current gameplay of users among a party, and other aspects and factors that can be used to create appropriate activity suggestions to the party. A suggestion can correspond to the party as a whole or in part (e.g., for a subset of users). Furthermore, one or more suggestions can be provided to a party at one or more points in time, such as after instantiation, after gameplay, or during gameplay, and may be provided concurrently with another suggestion. In some embodiments, the suggestions can be received within a video game application and interaction with the suggestion can cause a user to queue for the corresponding activity (e.g., game mode). These suggestions can also be received external to a video game application, such that user interaction with the suggestion causes one or more user's respective computing devices to run and/or execute a video game application and further cause the video game application to queue for the suggested activity (e.g., game mode,) with or without further user input, user direction, or user intervention.

In some instances, step 205 is optional and does not need to occur for process 200 to continue. As such, one or more users of a party can select an activity for the party to engage in, such as queuing to a game session of a game mode of a video game application.

At step 206 a queue request is received to queue the party to a game session of a game mode of a video game. In some embodiments, a queue request—or corresponding game mode—provides data to a party system, such as rules, policies, criteria, and/or other configurations of the like, that define one or more aspects, features, functions, parameters, permissions, limitations, and/or restrictions for parties queueing to play the game mode. As such, a party system can cause a party to be queued based in part on the data or rules included therein.

To simplify the present disclosure, the received queue request at step 206 corresponds to a game mode that has a party size limit that is lower than the size of the instantiated party (of step 204). As such, the description of process 200 is based in part on this and is provided by way of illustration, and not limitation.

At step 208, a party system can determine, create, and/or select a subset (e.g., a subset party) of users among the party to queue for gameplay in response to a received queue request. For example, the game mode corresponding to the queue request can have a limit of a three player party size for gameplay, as such, a party system can determine, create, and/or select a subset party to include players from the party to queue for the gameplay mode. The selection of the subset of players can be based in part on a number of rules or criteria (e.g., selection rules). These selection rules can be defined by a video game application and/or by a party and can include a process or criteria for selecting a subset of users for gameplay among a party.

In some embodiments, a party system creates one or more subset parties among the party. In some instances, there can be two or more playing parties among a party, wherein two or more subsets of users are in gameplay of the same or different game modes or game sessions.

At step 210 a party system can queue the determined, created, and/or selected subset party (e.g., playing party) for gameplay. Additionally, the extended party not queued for gameplay can proceed to engage in other activities, either within or external to the video game application and/or game session being played by the playing party. Through this both the extended party and playing party subsets can remain part of the (main) party. As a result, the entire party can proceed to engage with one another while a subset of the party participates in gameplay. In some embodiments, the extended party can choose to queue for a game mode of a video game application, of either the same or a different video game application (e.g., be game agnostic). As known to a person of skill in the art, a party that is game agnostic can correspond to a party system of a video game platform or video game service.

At step 212 party activity is monitored, such as during gameplay of a game session. A party system can monitor activity of a party, or of a user of a party, by accessing or receiving data, such as a game data, corresponding to one or more of the users of the party or corresponding to the activities, such as gameplay, the users of the party are engaging in. For example, during gameplay of the game session queued by the subset party, game data of the game session that corresponds to the users among the subset can be sent to and/or accessed by a party system. In some embodiments, step 212 can occur at any time and a party system can be configured to monitor party activity continuously from the time the party is instantiated or at discrete times.

At step 214 if a key interaction in gameplay is determined or detected as occurring among the activity monitored, process 200 continues to step 215 to modulate communications in response. In step 215, a party system can modulate, or instruct corresponding audio modules to modulate, communications among the party for the duration of the key interaction. As such, when the party system determines or detects that a key interaction has ended during gameplay, the party system can cease, or instruct to cease, the modulations of communications among the party.

In some embodiments, modulating communications among a party includes causing the communications between playing party members and extended party members to be modulated, decoupled, suppressed, altered, or suspended in real time. For instance, subset parties of a party can each include their own designated subset communication channels for the users among the subset to communicate over, and each of the subset communications channels can be communicatively coupled to other subset communication channels. As such, during gameplay, the subset communication channels can be decoupled, suppressed, or suspended, for the duration of the key interaction. Alternatively, the users among a party can each be part of a main communication channel, and a key interaction can cause the party system to redirect, suspend, or suppress communications between the playing party members and extended party members.

At step 214 if a key interaction is not occurring, process 200 continues to step 216 to determine if gameplay has ended. At step 216, if gameplay has not ended, party activity continues to be monitored at step 212. Otherwise, process 200 continues to step 218 to update the party selection list based in part on game data of the gameplay, among other things.

At step 218 a party selection list used in part to select users of the party to queue for gameplay is updated during or after gameplay. In some embodiments, updating the party selection list includes monitoring or analyzing game data or party activity to determine if one or more selection criteria of the party have been met to satisfy an update or change the list. As such, an update to the party selection list can be based at least in part on the activities or gameplay of the users among the party. The update can be made by a party system and/or by user input.

Selection Criteria

Figure 3:
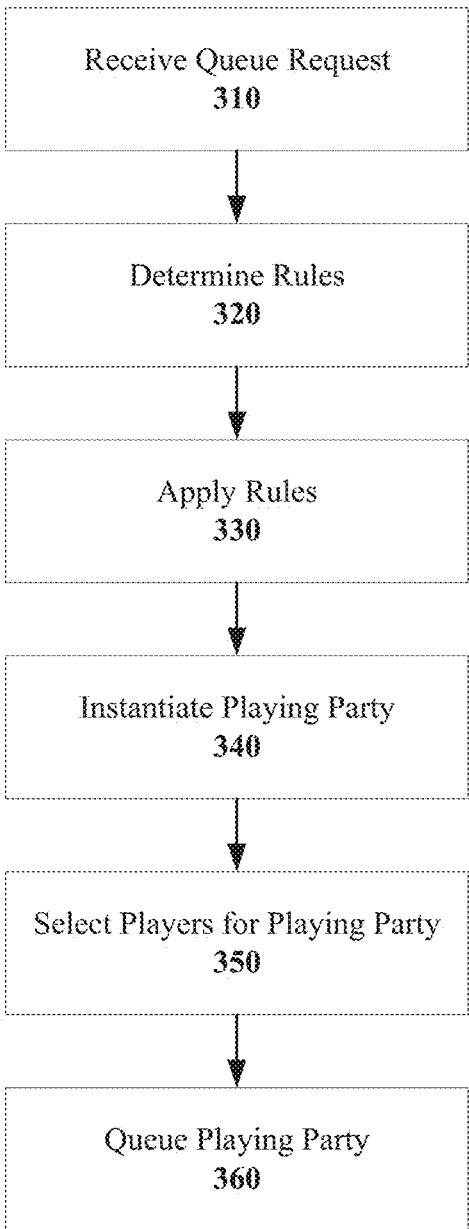
FIG. 3 is a flow diagram of a process to configure a subset of players for gameplay according to an example embodiment.

FIG. 3 is a flow diagram of a process to configure and select a subset of players for gameplay according to an example embodiment. As illustrated, process 300 is used to select a playing party for gameplay based in part on one or more rules and/or data. In some embodiments, process 300 corresponds to a party system of a video game application and/or service application, similar to party system 136 and 152 of FIG. 1

At step 310 a request to queue a party to game session of a game mode of a video game application is received.

At step 320 the rules and/or policies corresponding to parties queueing to the competitive game mode are determined. Data corresponding to rules and policies of parties can be communicated and/or determined when queueing to a competitive game mode. As an illustrative example, the competitive game mode of a video game application includes and provides data to a party system corresponding to an exploitation policy limiting one or more features of a party to prevent competitive advantage.

In some embodiments, data corresponding to the exploitation policy is provided (e.g., to a party system) as part of the queue request to a party system. Alternatively, the exploitation policy can be accessed and/or requested by a party system. Once accessed, the party system can determine the rules or limitations of the exploitation policy to apply to the party. In some cases, not all rules corresponding to the exploitation policy will apply to the current party, such as party size limitations or communication limitations if the party would not violate the rules or does not meet some other threshold or requirement for the rules to apply.

At step 330 the rules are applied to the party. To simplify the present disclosure, the received queue request at step 310 corresponds to a competitive game mode that has a party size limit that is lower than the size of the party and a communication restriction with extended party members. As such, the description of process 300 is based in part on this and is provided by way of illustration, and not limitation.

At step 340 a subset party (e.g., for playing party members) is created and/or instantiated by a party system based in part on the party size limitation of the competitive game mode. The created subset party is associated and/or corresponds to the party.

At step 350 players of the party are selected to be included among the subset party (e.g., the playing party). The party system selects players to include among the playing party based in part on selection criteria of the party. Once selected, the selected players are then placed into the playing party and queued for gameplay at step 360.

Selection criteria can be configured in various ways by one or more members of the party. There can be selection criteria corresponding to an initial game session of the party (e.g., where none of the party members have yet played). This can include participation in a mini-game or voting to determine the players among the party to be placed in the created subset party. Alternatively, the party system can analyze previous game data corresponding to the players of the party to determine which players should be placed among the party, such as those with least amount of recent play time.

In some embodiments, selection criteria can be bypassed through user input, such as input provided at the time of selection and/or queueing. For example, one or more members of a party can provide input (e.g., through a corresponding graphical user interface) to elect not to play and/or to spectate a game session, which can override and/or augment the application of selection criteria, such that their election takes precedence over other selection criteria and/or removes that member from being assessed as part of selection process. These inputs and/or elections by members of a party can be referred to as "overriding criteria".

In some embodiments, after at least one game session, the selection criteria can change to keep players of the party rotating in and out the subset party (e.g., the playing party). For example, a party can be configured with selection criteria that places or keeps players in a selection list for queueing to gameplay until they have played for a minimum amount of time or amount of game sessions. As such, game data corresponding to gameplay of the players can be used in part to determine whether a player in party has met the selection criteria.

As another example, the activities or actions of the extended party members can be used in party to determine which players should be next in the selection list. For instance, the extended party members can vote or rank players in the party based on a number of factors, such as their score in a mini game, their score in the game session, their play times, their average win rate, and/or other factors. Alternatively, the players in the extended party can be enabled full control over the party selection list, if configured as such among the party. Additionally, the selection criteria can be set to be random.

The steps and process of FIG. 2 and FIG. 3 can be associated with one or more hardware and/or software modules configured with computer-executable instructions, as known to those of skill in the art. It should be understood and appreciated that these processes and corresponding modules can be configured or organized in a number of ways, such that one or more of the steps are performed before, after, and/or simultaneously among other steps, and/or are otherwise omitted or substituted in whole or in part.

Party

Figure 4:
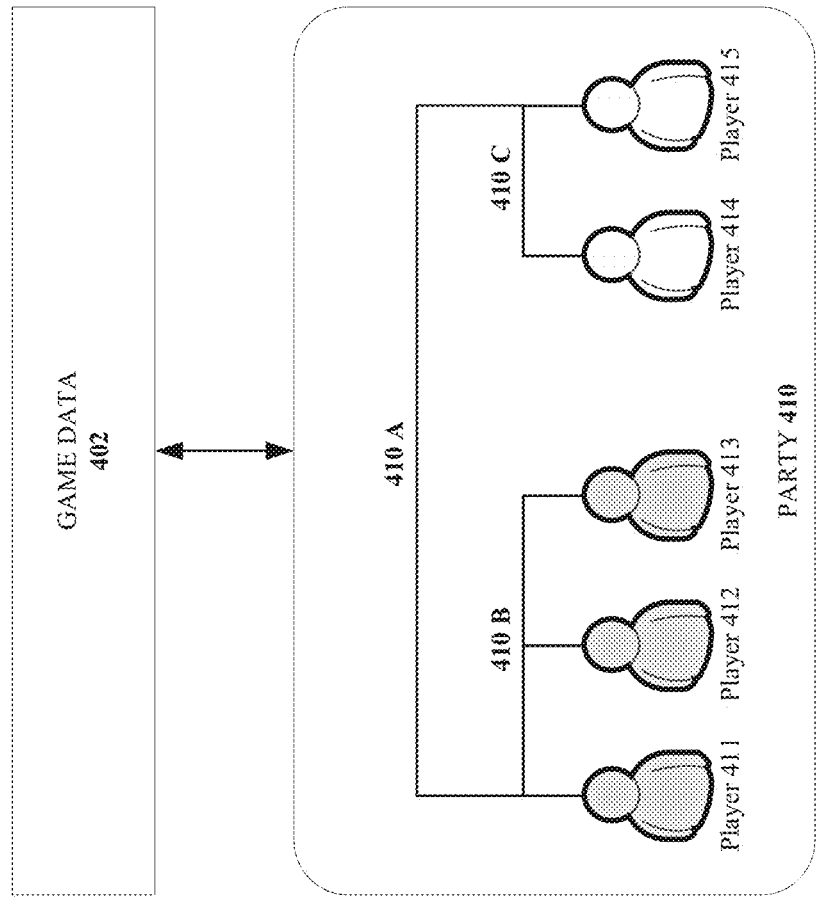
FIG. 4 is a diagram illustrating an extended party according to an example embodiment.

FIG. 4 is a diagram illustrating an extended party according to an example embodiment. Diagram 400 includes party 410 with playing party members (players 411, 412, and 413) and extended party members (players 414 and 415).

In some embodiments, a party system—similar to party system 136 and 152 of FIG. 1—is used to produce party 410. Accordingly, a party system is configured to receive or access rules and/or policies that govern or regulate communications, and/or other activities among party 410. These rules or policies correspond to one or more permissions or restrictions applied to a party—or subset party thereof—both within and outside of gameplay. As such, a party system can partition, segment, or separate activities and/or communication among or between the party members of party 410 based in part on these rules or policies. In some embodiments, these rules and policies are part of game data 402.

The rules and/or policies among game data 402 can be defined and/or configured by a party, or member thereof. For example, one or more members can define and/or configure a rule or policy, such as when a party is being formed or configured for instantiation or any time thereafter. In some embodiments, rules or policies corresponding to activities, key interactions, communications, party size, selection criteria, and other factors can be configured by users or players among a party.

The rules and/or policies among game data 402 can also be included as part of a video game and/or game mode thereof. The rules and/or policies corresponding to a game mode can be made in part to maintain and preserve the integrity of a video game by preventing parties from causing, providing, or receiving competitive advantages and exploits during gameplay. In some embodiments, the game mode specific rules can be applied to a party prior to and/or during gameplay. For instance, rules corresponding to a competitive game mode of a video game can prevent any extended party members from engaging with playing party members for the duration of the game session to avoid any party member receiving and/or providing a competitive advantage.

As a first non-limiting illustrative example, game data 402 includes rules or policies that prevent extended party members from spectating the gameplay of the playing party members or of the game session the playing party members are currently playing in to prevent any of the party members from providing and/or receiving a competitive advantage.

As a second non-limiting illustrative example, game data 402 includes rules or policies against voice chat communications among or between playing party members and extended party members to prevent any of the party members from providing and/or receiving a competitive advantage. As such, a party system can cause party 410 to include or provide a main voice communication channel (410A) for the entire party and also provide sub-voice communication channel 410B for playing party members (players 411, 412, and 413) and sub-voice communication channel 410C for extended party members (players 414 and 415).

As a third non-limiting illustrate example, game data 402 includes data corresponding to key interactions during gameplay—for modulating communications during gameplay; similar to the communication modulation described among the description of FIG. 2. As such, during gameplay, a party system can cause the main communication channel 410A of party 410 to remain open until a key interaction occurs. When a key interaction occurs, a party system can cause one or more subsets of party 410 (e.g., playing party members or extended party members) to enter into a sub communication channel (e.g., 410B and/or 410C); such as for the duration of the key interaction. In this way, a party system can ensure the playing party members can focus on the audio of the gameplay and the communications from other playing party members to more advantageously play through a moment of key interaction in gameplay.

Key Interaction

Figure 5:
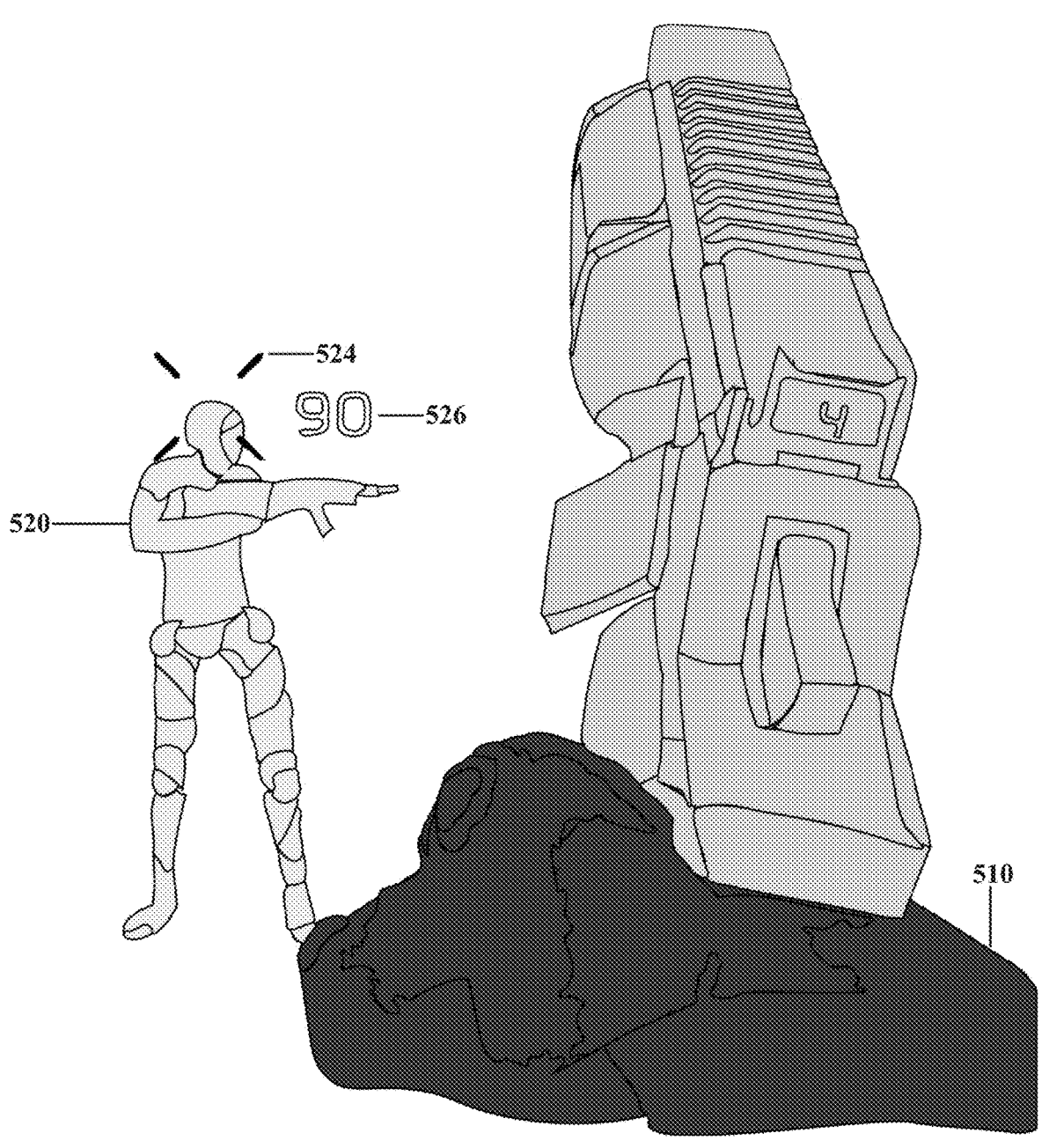
FIG. 5 is a diagram illustrating a key interaction according to an example embodiment.

FIG. 5 is a diagram illustrating a key interaction for modulating communications among a party according to an example embodiment. As illustrated, diagram 500 corresponds to an instance of a key interaction during gameplay, the game data of which can be used by a party system, such as for modulating communications and/or updating a party list.

The key interaction between player character 510 and player character 520 illustrated in diagram 500 is an instance of damage inflicted to player character 520 from player character 510. As shown, diagram 500 is in the first perspective of player character 510, such that hands wielding a weapon illustrate player character 510. Damage indicator 524 is an indication of damage infliction on player character 520 by player character 510. Damage amount 526 is a damage value associated with the damage infliction on player character 520.

Data corresponding to the key interaction is generated, captured, and/or stored as game data of the respective game session. In some embodiments, game data of a key interaction includes data that provides context to the key interaction, such as each player character involved, the player teams associated with each player character, the player accounts the player characters and/or player teams are associated with, the location (among a virtual interactive environment) where the key interaction occurred, the distance between the player characters, the weapons, items, attack or other gameplay action or element of the like associated with each key interaction, the locations on the player characters where damage is inflicted, the occurrence of a player character being knocked down or eliminated as a result of an key interaction, the occurrence of a player team and/or player character advancing a gameplay objective as a result of an key interaction, among other telemetry or game data.

This game data of a key interaction can be used by a party system of a video game to modulate communications among a party. For example, player characters 510 and 520 are of different player teams (e.g., opponents) in a game session, and each is associated with a user of a video game. The users controlling player characters 510 and 520 can each be among a party during the gameplay, such that a party system could modulate communications among their respective parties during this key interaction.

Additionally, the game data of a key interaction can also be used by a party system to monitor and/or progress one or more challenges and/or criteria set by the party. For example, the party can create a challenge for party members to make at least 10 headshots during one or more game sessions. Here, damage indicator 524 marks a headshot that player character 510 inflicted on player character 520. As such, the party system can use the corresponding game data of the headshot to fulfill and/or progress a corresponding headshot selection criteria or challenge set by the party.

Diagram 500 is provided by way of illustration, and not limitation, to one example of a key interaction during gameplay (e.g., among a game session of a video game). Instances of key interactions in a video game may also include gameplay actions in which one player character and/or player team applies a buff, debuff, revives, identifies, tags, indicates, stuns, flashes, disables, burns, bamboozles, misguides, flanks, blinds, suppresses, stops, blocks, damages, or heals another player character and/or player team. Additionally, instances of key interactions may occur outside of gameplay, such as among other forms of interactions and/or interactivity that one or more party members can engage in; including, but not limited to, spectating, text chat, and mini games, among others.

Computing Device

Figure 6:
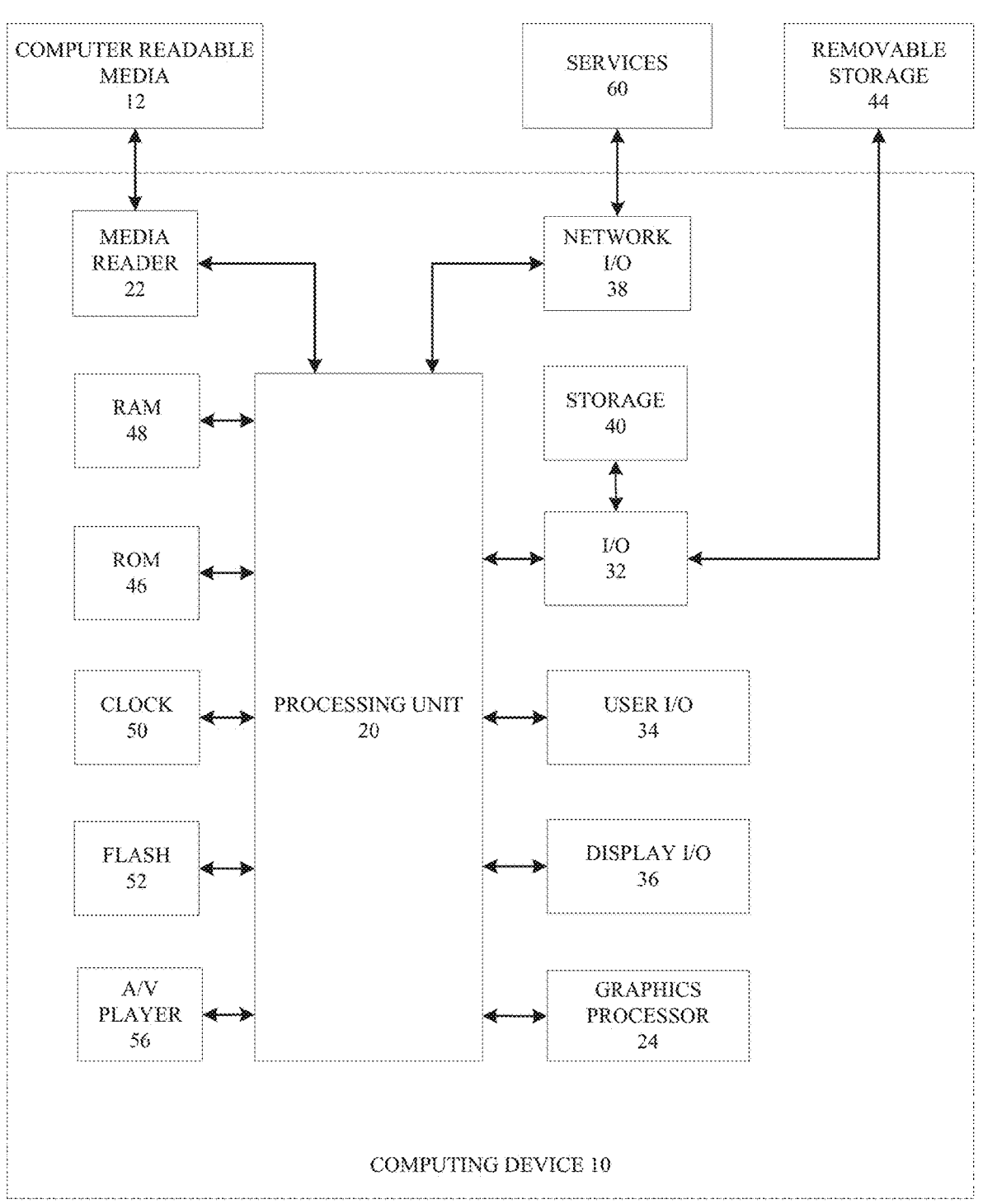
FIG. 6 is a diagram of an example computing device usable to perform any of the methods described herein, including for extendable parties for gameplay.

FIG. 6 illustrates an example embodiment of a computing device 10. In some embodiments, some or all of the aforementioned systems and computing devices—such as computing device 110 of FIG. 1—are similar to computing device 10. The example computing device 10 can store and/or execute computer executable instructions (or code) of applications (or programs or software), such as video game applications, interactive applications, and/or other applications known to those of skill in the art that could include or benefit from the systems and methods described herein.

Computing device 10 can be or include any one or a combination of systems known to those of skill in the art, including, for example, a desktop, laptop, game application platform, game console, virtual reality system, augmented reality system, television, television set-top box, television, network-enabled kiosk, car-console devices, computerized appliance, wearable device (e.g., smart watch, glasses with computing functionality), and wireless mobile devices (e.g., smart phones, PDAs, tablets) and other general-purpose computing devices known to those of skill in the art.

As shown, computing device 10 includes processing unit 20 that interacts with other components of the computing device 10 and external components. A media reader 22 communicates with computer readable media 12. The media reader 22 may be an optical disc reader capable of reading optical discs, such as DVDs or Blu Ray discs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system for executing software among graphics processor 24, such as a video game application.

Computing device 10 also includes various components for enabling input/output, such as an I/O 32, a user I/O 34, a display I/O 36, and a network I/O 38. I/O 32 interacts with storage element 40 and removable storage media 44 to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network (e.g., receiving and sending network data communications). Network I/O 38 may be used during execution of software applications by computing device 10; such as when a video game application communicates with a game server over a network.

Display output signals produced by processing unit 20 and/or graphics processor 24 can be sent to display by display I/O 36, including signals for displaying visual content produced by computing device 10; such as display output rendered by a video game application, including graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie or other media as known to those of ordinary skill in the art. An audio/video player 56 may include or use software for encoding or decoding media for playback.

Computer executable instructions, applications, programs, or code (e.g., software) can be stored in ROM 46, RAM 48, media 12, and/or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, applications can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, services 60 accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

The disclosed subject matter can include an apparatus for performing the operations herein. This apparatus may be specially constructed for the required purposes, or it may comprise a general-purpose computer selectively activated or reconfigured by an application stored and/or executed by computing device 10. Such an application may be stored in a non-transitory computer readable medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may include a non-transitory computer readable medium having stored thereon applications or instructions, which may be used (e.g., executed) to instruct a system or computing devices to perform a process according to the disclosed subject matter. A non-transitory computer readable medium includes any mechanism for storing or transmitting information in a form readable by a computing device and other systems of the like known to those of skill in the art.

The applications or instructions of computing device 10 can be stored and/or executed among a local environment and/or among in a distributed environment of computing devices, as known to those of skill in the art. Different applications can include varying instructions, components, graphical configurations, and/or data for supporting their runtime execution on different hardware (e.g., different types of computing devices).

A locally executed application does not rely on or utilize an external computing device (e.g., a system other than computing device 10) to execute the application. In some instances, a locally executable video game application can communicate with external systems or devices, such as external servers, to retrieve information associated with the video game, such as game patches, game authentication, cloud saves, user account data, previously trained model data, or other features.

In distributed implementations, computing device 10 may execute portions of a video game application, while other systems or devices such as external servers execute other portions of the video game application. For instance, massively multiplayer online role-playing games (MMORPGs) include client portions (e.g., video game application) of the video game executed by computing devices of or corresponding to users or players, and server portions executed by one or more servers. It should be understood that applications described herein can be a locally executable game or a distributed application.

The present disclosure may use machine learning. Machine learning is a subfield of artificial intelligence, which, to persons of ordinary skill of the art, corresponds to underlying algorithms and/or frameworks (commonly known as "neural networks" or "machine learning models") that are configured and/or trained to perform and/or automate one or more tasks or computing processes. For simplicity, the terms "neural networks" and "machine learning models" can be used interchangeably and can be referred to as either "networks" or "models" in short.

The present disclosure may use deep learning. Deep learning is a subfield of artificial intelligence and machine learning, which, to persons of ordinary skill of the art, corresponds to multilayered implementations of machine learning (commonly known as "deep neural networks"). For simplicity, the terms "machine learning" and "deep learning" can be used interchangeably.

As known to a person of ordinary skill in the art, machine learning is commonly utilized for performing and/or automating one or more tasks such as identification, classification, determination, adaptation, grouping, and generation, among other things. Common types (e.g., classes or techniques) of machine learning include supervised, unsupervised, regression, classification, reinforcement, and clustering, among others.

Among these machine learning types are a number of model implementations, such as linear regression, logistic regression, evolution strategies (ES), convolutional neural networks (CNN), deconvolutional neural networks (DNN), generative adversarial networks (GAN), recurrent neural networks (RNN), and random forest, among others. As known to a person of ordinary skill in the art, one or more machine learning models can be configured and trained for performing one or more tasks at runtime of the model.

As known to a person of ordinary skill in the art, the output of a machine learning model is based at least in part on its configuration and training data. The data that models are trained on (e.g., training data) can include one or more data types. In some embodiments, the training data of a model can be changed, updated, and/or supplemented throughout training and/or inference (e.g., runtime) of the model.

The systems, methods, and/or computing devices of the present disclosure can include machine learning modules. A "machine learning module" is a software module and/or hardware module including computer-executable instructions to configure, train, and/or deploy (e.g., execute) one or more machine learning models.

Some aspects of the present disclosure include subject matter corresponding to the gameplay of video game applications. As known to a person of ordinary skill in the art, the gameplay of a video game is commonly known as occurring among a game session within one or more instances of one or more virtual interactive environments. The gameplay of a video game provides interactivity with one or more aspects of a video game.

A game session may include a number of player characters and/or non-player characters. As known to those of skill in the art, player characters are character models that can be controlled or directed (at least primarily) by users or players through inputs at their respective computing devices and can perform gameplay actions or commands. "Non-player characters" (also referred to herein as "NPCs") are characters that are not or cannot be controlled and/or directed (primarily by users or players). Rather, NPCs can be configured with computer executable instructions to perform one or more gameplay tasks and/or actions, with and/or without the need for input or interaction from a user/player or player character.

A game session may include a number of player objects. Player objects can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a user or player can control or direct one or more player objects in a game session, including, in some instances, by controlling player characters which in turn causes the objects to be controlled.

For simplicity, player characters and player objects disclosed are collectively referred to herein as player characters in some embodiments. It should be understood that, as used herein, "controllable" refers to the characteristic of being able and/or configured to be controlled and/or directed (e.g., moved, modified, etc.) by a player or user through one or more input means, such as a controller or other input device, by a player or user. As known to a person of ordinary skill in the art, player characters include character models configured to receive input.

Some aspects of the present disclosure include subject matter corresponding to the data of video game applications. As known to a person of ordinary skill in the art, game data is data corresponding to one or more aspects of a video game application. Game data includes data such as state data, simulation data, rendering data, digital assets, and other data of the like.

State data is commonly known as data describing a state of a player character, virtual interactive environment, and/or other virtual objects, actors, or entities—in whole or in part—at one or more instances or periods of time during a game session of a video game. For example, state data can include the current location and condition of one or more player characters among a virtual interactive environment at a given time, frame, or duration of time or number of frames.

Simulation data is commonly known as the underlying data corresponding to simulation (e.g., physics and other corresponding mechanics) to drive the simulation of a model or object in a game engine. For example, simulation data can include the joint and structural configuration of a character model and corresponding physical forces or characteristics applied to it at instance or period of time during gameplay, such as a "frame", to create animations, among other things.

Render Data is commonly known as the underlying data corresponding to rendering (e.g., visual and auditory rendering) aspects of a game session, which are rendered (e.g., for output to an output device) by a game engine. For example, render data can include data corresponding to the rendering of graphical, visual, auditory, and/or haptic output of a video game, among other things.

Game data can also include digital game assets. For instance, game assets can include virtual objects, character models, actors, entities, geometric meshes, textures, terrain maps, animation files, audio files, digital media files, font libraries, visual effects, and other digital assets commonly used in video games of the like.

In some embodiments, a game session is based in part on game data. During a game session, one or more aspects of gameplay (e.g., rendering, simulation, state, gameplay actions of player characters) uses, produces, generates, and/or modifies game data. Likewise, gameplay events, objectives, triggers, and other aspects, objects, or elements of the like also use, produce, generate, and/or modify game data.

Game data may be updated, versioned, and/or stored periodically as a number of files to a computing device. Additionally, game data, or copies and/or portions thereof, can be stored, referenced, categorized, or placed into a number of buffers or storage buffers. A buffer can be configured to capture particular data, or data types, of game data for processing and/or storage. For simplicity, the terms "data", "game data", "game data", "state data", "simulation data", and "render data" can be used interchangeably to refer to the data of, or corresponding to, a video game.

Some aspects of the present disclosure include subject matter corresponding to video games, including video game components corresponding to the software of a video game. As known to a person of ordinary skill in the art, game code is software defining the gameplay, features, and aspects of a video game whereas a game engine provides underlying frameworks and software that support and facilitate execution of the game code (e.g., gameplay)

As a non-limiting descriptive example, a game engine includes, among other things, a renderer, simulator, and stream layer. A game engine uses game data (e.g., state data, render data, simulation data, audio data, and other data types of the like) to generate and/or render one or more outputs (e.g., visual output, audio output, and haptic output) for one or more computing devices. In some embodiments, a game engine is a distributable computer executable runtime portion of a development client, such as a video game development engine.

A renderer is a graphics framework that manages the production of graphics corresponding to lighting, shadows, textures, user interfaces, and other effects to game assets of the like among a game engine. A simulator refers to a framework that manages simulation aspects corresponding to physics and other corresponding mechanics used in part for animations and/or interactions of gameplay objects, entities, characters, lighting, gasses, and other game assets or effects of the like. A stream layer is a software layer that allows a renderer and simulator to execute independently of one another among a game engine by providing a common execution stream for renderings and simulations to be produced and/or synchronized (e.g., scheduled) at and/or during runtime.

A game engine also includes an audio engine or audio renderer that produces and synchronizes audio playback with or among the common execution of a stream layer. For example, an audio engine of a game engine can use game data to produce audio output and/or haptic output from game data.

As used herein in some embodiments, video game applications can also use and/or include Software Development Kits (SDKs), Application Program Interfaces (APIs), Dynamically Linked Libraries (DLLs), and other software libraries, components, modules, shims, or plugins that provide and/or enable a variety of functionality; such as—but not limited to—graphics, audio, font, or communication support, establishing and maintaining service connections, performing authorizations, and providing anti-cheat and anti-fraud monitoring and detection, among other things.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated (e.g., among a computing device). It has proven convenient at times, principally for reasons of common usage, to refer to these signals as bits, values, elements, symbols, characters, terms, numbers, or the like.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A system comprising:
an audio system;
one or more processors; and
one or more memory devices communicatively coupled to one or more processors, the one or memory devices storing computer-executable instructions that, when executed by the one or more processors, cause the one or more processors to:
instantiate a party including a plurality of players;
receive a request to queue the party to a game session of a video game;
select, based on selection criteria, a first subset of players among the party to queue to the game session;
queue the first subset to the game session;
instantiate the game session of the video game for execution by the one or more processors;
monitor game data during the game session, the game data corresponding to gameplay of the first subset; and
modulate, during the game session, audio communications among the party based at least in part on the game data monitored by controlling the audio system to modulate the audio communications.

2. The system of claim 1, further configured to:
select, based on selection criteria, a second subset of players among the party to queue a second game session; and
queue the second subset to the second game session.

3. The system of claim 1, wherein the selection criteria is based in part on data corresponding to at least one of the following:
(a) input from one or more player accounts of the party;
(b) interactivity among the one or more player accounts of the party;
(c) game data of another game session;
(d) one or more subsets of player accounts of the party; or
(e) a party size limit of a game mode.

4. The system of claim 1, wherein the party is instantiated externally from the video game.

5. The system of claim 1, wherein a game mode of the video game is suggested to the party.

6. The system of claim 1, wherein the first subset remains in communication with the remainder of the party during the game session.

7. The system of claim 1, wherein modulating communication occurs between the first subset and the remainder of the party for one or more periods of time among the game session based in part on at least one of following:
(a) game data corresponding to a key interaction in gameplay;
(b) rules defined by the party; or
(c) an exploitation policy.

8. A computer implemented method comprising:
instantiating a party including a plurality of players;
receiving a request to queue the party to a game session of a video game;

selecting, based on selection criteria, a first subset of players among the party to queue to the game session;

queuing the first subset to the game session;

instantiating the game session of the video game on a computing system;

monitoring game data during the game session, the game data corresponding to gameplay of the first subset; and modulating, during the game session, audio communications among the party based at least in part on the game data monitored by controlling an audio system of the computing system to modulate the audio communications.

9. The method of claim 8, further comprising:

selecting, based on selection criteria, a second subset of players among the party to queue a second game session; and queuing the second subset to the second game session.

10. The method of claim 8, wherein the selection criteria is based in part on data corresponding to at least one of the following:

(a) input from one or more player accounts of the party;

(b) interactivity among the one or more player accounts of the party;

(c) game data of another game session;

(d) one or more subsets of player accounts of the party; or (e) a party size limit of a game mode.

11. The method of claim 8, wherein the party is instantiated externally from the video game.

12. The method of claim 8, wherein a game mode of the video game is suggested to the party.

13. The method of claim 8, wherein the subset remains in communication with the remainder of the party during the game session.

14. The method of claim 8, wherein modulating communication occurs between the subset and the remainder of the party for one or more periods of time among the game session based in part on at least one of following:

(a) game data corresponding to a key interaction in gameplay;

(b) rules defined by the party; or (c) an exploitation policy.

15. A non-transitory computer readable medium storing computer-executable instructions configured to:

instantiate a party including a plurality of players;

receive a request to queue the party to a game session of a video game;

select, based on selection criteria, a first subset of players among the party to queue to the game session;

queue the first subset to the game session;

instantiate the game session of the video game for execution by a computing system;

monitor game data during the game session, the game data corresponding to gameplay of the first subset; and modulate, during the game session, audio communications among the party based at least in part on the game data monitored by controlling an audio system of the computing system to modulate the audio communications.

16. The non-transitory computer readable medium of claim 15, further storing computer-executable instructions configured to:

select, based on selection criteria, a second subset of players among the party to queue a second game session; and queue the second subset to the second game session.

17. The non-transitory computer readable medium of claim 15, wherein the selection criteria is based in part on data corresponding to at least one of the following:

(a) input from one or more player accounts of the party;

(b) interactivity among the one or more player accounts of the party;

(c) game data of another game session;

(d) one or more subsets of player accounts of the party; or (e) a party size limit of the game mode.

18. The non-transitory computer readable medium of claim 15, wherein a game mode of the video game is suggested to the party.

19. The non-transitory computer readable medium of claim 15, wherein the subset remains in communication with the remainder of the party during the game session.

20. The non-transitory computer readable medium of claim 15, wherein modulating communication occurs between the subset and the remainder of the party for one or more periods of time among the game session based in part on at least one of following:

(a) game data corresponding to a key interaction in gameplay;

(b) rules defined by the party; or (c) an exploitation policy.

\* \* \* \* \*